United States Patent
Barbalho et al.

(10) Patent No.: US 11,138,118 B2
(45) Date of Patent: Oct. 5, 2021

(54) METHOD AND APPARATUS FOR DYNAMICALLY ADAPTING SIZES OF CACHE PARTITIONS IN A PARTITIONED CACHE

(71) Applicant: EMC IP HOLDING COMPANY LLC, Hopkinton, MA (US)

(72) Inventors: Hugo de Oliveira Barbalho, Rio de Janeiro (BR); Jonas Furtado Dias, Rio de Janeiro (BR); Vinícius Michel Gottin, Rio de Janeiro (BR)

(73) Assignee: EMC IP Holding Company LLC, Hopkinton, MA (US)

(*) Notice: Subject to any disclaimer, the term of this patent is extended or adjusted under 35 U.S.C. 154(b) by 0 days.

(21) Appl. No.: 16/740,601

(22) Filed: Jan. 13, 2020

(65) Prior Publication Data

US 2021/0216460 A1 Jul. 15, 2021

(51) Int. Cl.
*G06F 12/0846* (2016.01)

(52) U.S. Cl.
CPC .. *G06F 12/0848* (2013.01); *G06F 2212/1044* (2013.01)

(58) Field of Classification Search
CPC ............. G06F 12/0848; G06F 12/0871; G06F 2212/1044; G06F 2212/282; G06F 2212/604
See application file for complete search history.

(56) References Cited

U.S. PATENT DOCUMENTS

| | | | |
|---|---|---|---|
| 2015/0095587 A1* | 4/2015 | Xu | G06F 12/126 711/136 |
| 2016/0062904 A1* | 3/2016 | Chockler | G06F 12/121 711/133 |
| 2016/0342518 A1* | 11/2016 | Park | G06F 12/0811 |
| 2020/0174936 A1* | 6/2020 | Wang | G06F 12/0871 |

OTHER PUBLICATIONS

Wikipedia, "Cache replacement policies," 2019, https://web.archive.org/web/20191231232753/https://en.wikipedia.org/wiki/Cache_replacement_policies.*

* cited by examiner

*Primary Examiner* — Tracy A Warren
(74) *Attorney, Agent, or Firm* — Anderson Gorecki LLP

(57) ABSTRACT

The sizes of cache partitions, in a partitioned cache, are dynamically adjusted by determining, for each request, how many cache misses will occur in connection with implementing the request against the cache partition. The cache partition associated with the current request is increased in size by the number of cache misses and one or more other cache partitions is decreased in size causing cache evictions to occur from the other cache partitions rather than from the current cache partition. The other cache partitions, that are to be decreased in size, may be determined by ranking the cache partitions according to frequency of use and selecting the least frequently used cache partition to be reduced in size.

13 Claims, 5 Drawing Sheets

METHOD AND APPARATUS FOR DYNAMICALLY ADAPTING SIZES OF CACHE PARTITIONS IN A PARTITIONED CACHE

FIELD

This disclosure relates to computing systems and related devices and methods, and, more particularly, to a method and apparatus for dynamically adapting sizes of cache partitions in a partitioned cache.

SUMMARY

The following Summary and the Abstract set forth at the end of this document are provided herein to introduce some concepts discussed in the Detailed Description below. The Summary and Abstract sections are not comprehensive and are not intended to delineate the scope of protectable subject matter, which is set forth by the claims presented below.

All examples and features mentioned below can be combined in any technically possible way.

In some embodiments, a method of dynamically adjusting sizes of cache partitions in a partitioned cache includes, for each request, determining how many cache misses will occur for the current request from the associated cache partition. If the current request will result in one or more cache misses, the method further includes determining whether to increase the size of the cache partition associated with the request. If a determination is made to increase the size of the cache partition associated with the request, the method determines which cache partition or set of other cache partitions should be reduced in size to accommodate the increase in size of the cache partition associated with the current request. In some embodiments, the cache partition associated with the current request is always increased in size. In some embodiments, a data structure is used to rank partitions based on the occurrence of requests, and the last ranked partition is reduced in size by the number of cache misses associated with the current request.

DETAILED DESCRIPTION

Figure 1:
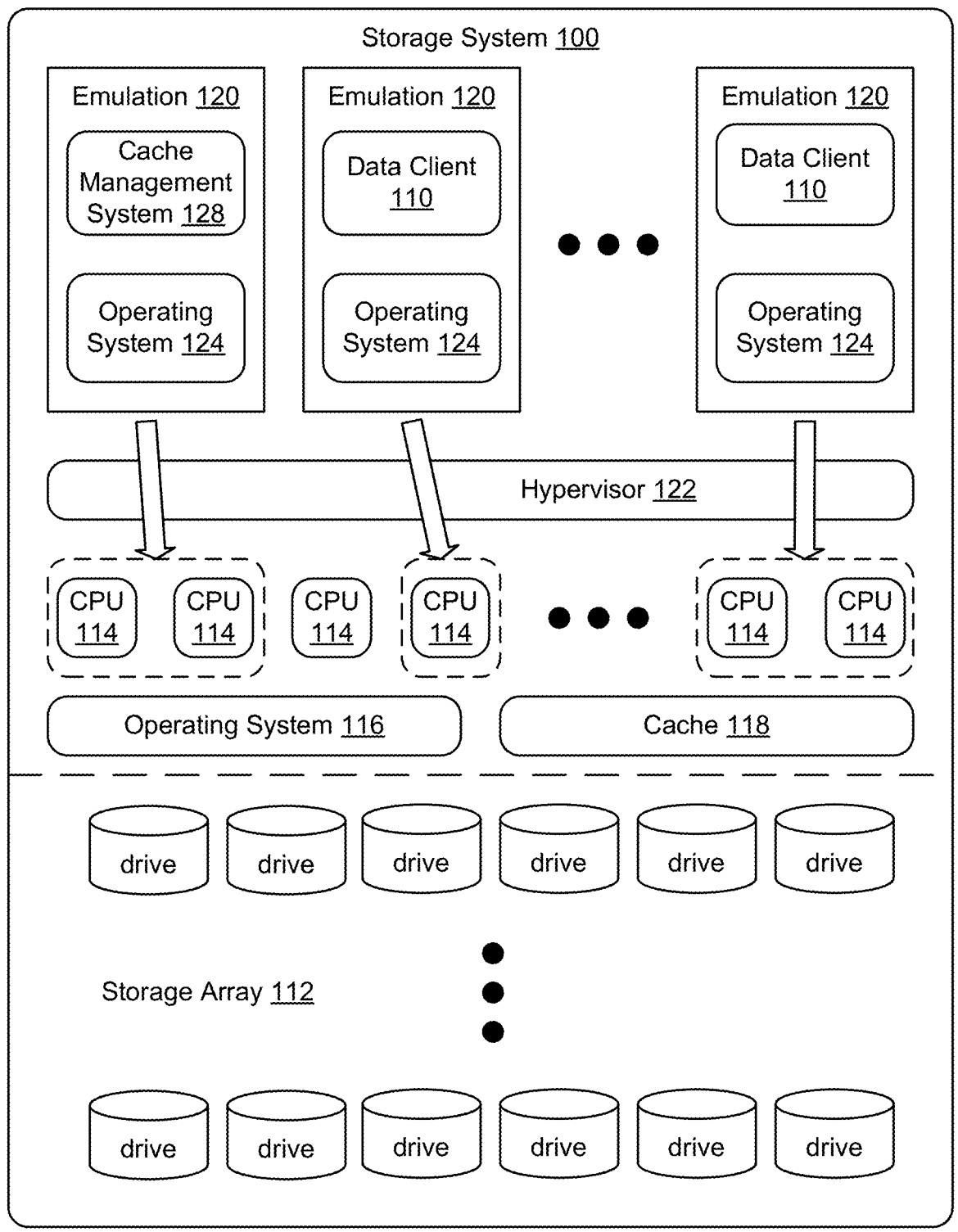
FIG. 1 is a functional block diagram of an example storage system, according to some embodiments.

FIG. 1 is a functional block diagram of an example storage system 100, in which data clients 110 have access to storage resources provided by a storage array 112. As shown in FIG. 1, in some embodiments the storage system 100 has physical resources including a number of CPU processor cores 114, operating system 116, partitioned cache 118, and other physical resources.

Storage array 112 may be implemented using numerous physical drives using different types of memory technologies. In some embodiments the drives used to implement storage array 112 are implemented using Non-Volatile Memory (NVM) media technologies, such as NAND-based flash, or higher-performing Storage Class Memory (SCM) media technologies such as 3D XPoint and Resistive RAM (ReRAM). Storage array 112 may be directly connected to the other components of the storage system 100 or may be connected to the other components of the storage system 100, for example, by an InfiniBand (IB) bus or fabric.

Data clients 110 act as hosts and provide access to the storage resources provided by storage array 112. Examples of data clients 110 may include but are not limited to file servers, email servers, block servers, and databases. The storage system 100 maintains data for the data clients 110 in storage array 112. For example, data client 110 may write data to the storage system 100 and read data from the storage system 100 in order to perform various functions.

In some embodiments, data clients 110 execute in emulations 120 such as a virtual machine instantiated in the context of the storage system 100. In some embodiments, a hypervisor 122 abstracts the physical resources of the storage system 100 from emulations 120, and allocates physical resources of storage system 100 for use by the emulations 120. Each emulation 120 has an emulation operating system 124 and one or more application processes running in the context of the emulation operating system 124.

Figure 2:
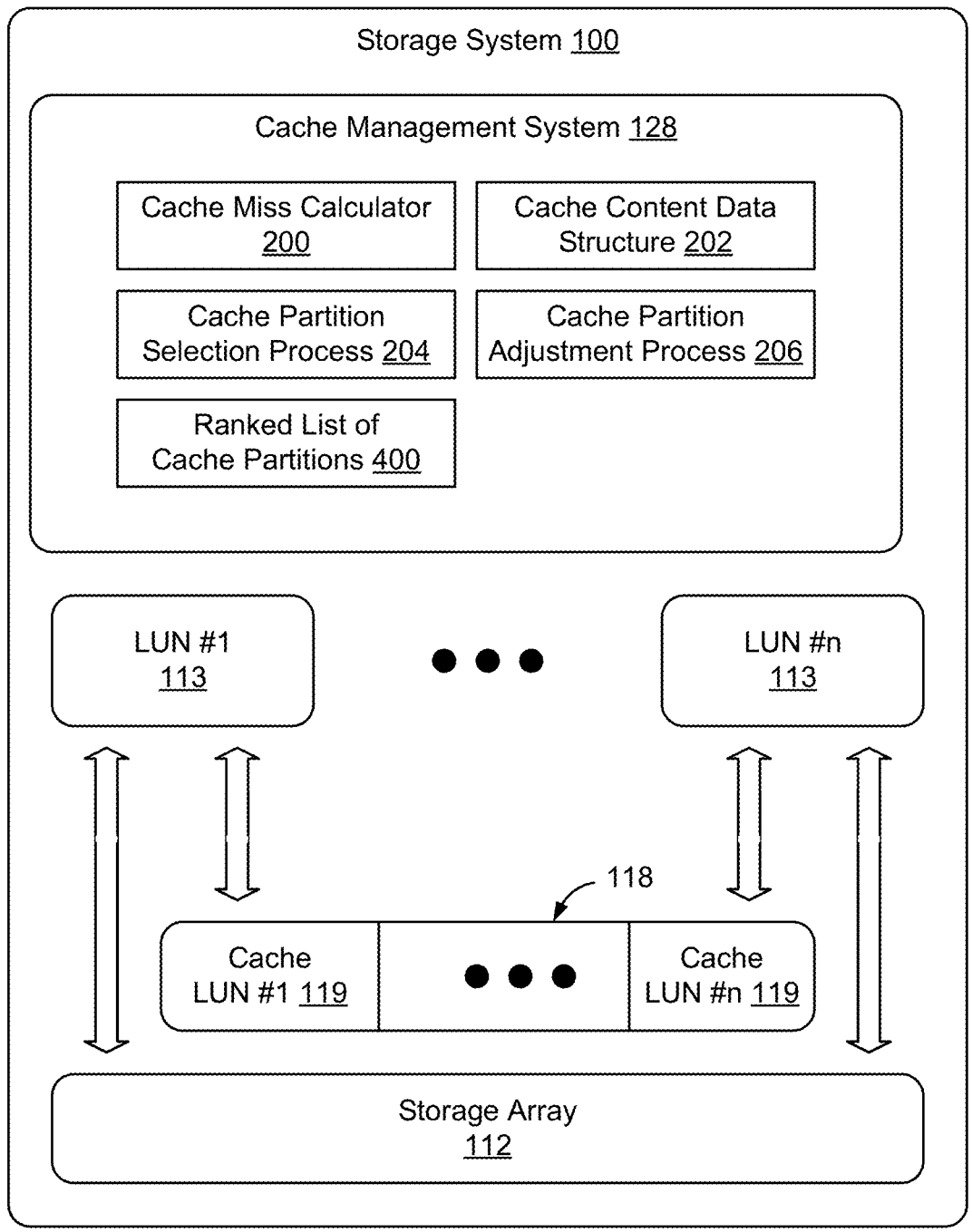
FIG. 2 is a functional block diagram of an example storage system showing the cache management aspects in greater detail, according to some embodiments.

FIG. 2 is a functional block diagram of an example storage system showing the cache management aspects in greater detail, according to some embodiments. As shown in FIG. 2, the storage resources of the storage array 112, in some embodiments, are abstracted and presented to the data clients 110 as logical units (LUNs). A LUN is a logical construct which enables the physical storage resources of the storage array 112 to be abstracted from the data client 110.

Logical storage devices (LUNs) 113 are created and presented to the data clients 110 for use by the data client 110 to perform IO operations. In some embodiments, the LUN appears to the data client 110 as a single data storage device having a set of contiguous fixed-size LBAs (logical block addresses) on which data used by the data client 110 resides and can be stored. However, the actual resources used by the storage system to store the data may reside at non-contiguous addresses (tracks) on various different managed drives of storage array 112. In some embodiments, the storage system 100 maintains metadata that indicates, among various things, mappings between the LUN and the back-end tracks on drives of storage array 112.

When an IO request is received, the storage system 110 first tries to service the IO request from the cache 118. If the data associated with the request is stored in cache 118, the storage system 110 will be able to service the request much faster than if the data needs to be retrieved from managed drives of storage array 112. Accordingly, correctly placing data with a high probability of being requested on fast memory media can substantially reduce the response times of input/output (I/O) requests.

Since dynamic random-access memory (DRAM) hardware is expensive, physical cache resources are often limited. Further, resources meant for caching, such as cache 118 of FIG. 1, are usually shared among multiple beneficiaries. One way to enable the cache 118 to be shared is to partition the cache 118 into cache partitions 119. According to some embodiments, a process of dynamically adjusting the sizes of cache partitions 119 is provided as discussed in greater detail below.

As shown in FIG. 2, in some embodiments the storage system includes a cache management system 128 configured to dynamically adjust the sizes of cache partitions 119 for a set of LUNs competing for access to the cache 118. In some embodiments, as discussed in greater detail below, the cache management system 128 includes a cache miss calculator 200, a cache content data structure 202, a cache partition selection process 204, and a cache partition adjustment process 206. Each of these components is discussed in greater detail below.

In some embodiments, a method of dynamically adjusting sizes of cache partitions in a partitioned cache includes, for each request, determining how many cache misses will occur for the current request from the associated cache partition. In some embodiments, the cache miss calculator 200 uses the cache content data structure 202 to determine how many cache misses will occur for the current request before the current request is implemented against the respective cache partition. As used herein, the phrase "before the current request is implemented against the respective cache partition" means before the content of the current cache partition is adjusted in any way based on receipt of the current request.

If implementing the current request associated with the respective cache partition will result in one or more cache misses, the method further includes determining whether to increase the size of the cache partition associated with the current request. If a determination is made to increase the size of the cache partition associated with the current request, the method determines which cache partition or set of other cache partitions should be reduced in size to accommodate the increase in size of the cache partition associated with the current request. In some embodiments, the cache partition selection process 204 determines whether the cache partition associated with the request should be increased in size and, if so which other partition or set of partitions should be decreased in size to accommodate the increased size of the cache partition associated with the current request. In some embodiments, the cache partition associated with the current request is always increased in size. In some embodiments, a data structure 400 is used to rank partitions based on the occurrence of requests, and the last ranked partition is reduced in size by the number of cache misses associated with the current request. The cache partition adjustment process 206, in some embodiments, is responsible for implementing the decisions of the cache management system 128 to adjust the sizes of the cache partitions of cache 118.

As described in greater detail herein, in some embodiments the cache management system 128 is configured to dynamically adjust the sizes of partitions 119 of a partitioned cache 118. Before evicting a piece of data from a cache partition 119 in connection with implementing a request on the cache partition, the cache management system 128 evaluates if it should increase the size of the cache partition to avoid the eviction or accept the potential future losses incurring from evicting that piece of data. Whenever a decision is made to increase the size of the cache partition associated with the current request, an additional decision is made to select which other cache partition 119 or set of cache partitions 119 will be reduced in size to accommodate the increase in size of the cache partition associated with the current request. The cache management system 128 can implement this process on any cache system, although it is specially designed for cache systems that partition the cache memory area 118 into separate regions to serve different beneficiaries. In some embodiments, the method relies on keeping one partition per beneficiary to minimize the influence of conflicting access patterns.

Consider a physical memory implementing cache 118 to have M slots to be used for caching purposes. A slot is an arbitrary unit of data, which may vary depending on the implementation of the storage system 100. The terminology applied may typically refer to pages or (sets of) blocks as the contents of the slots.

Let there be n partitions. Each cache partition $C_i$, for $1 \leq i \leq n$, will have $|C_i|$ slots, which are physically stored in memory such that $\Sigma_{\forall i} |C_i| = M$. Let $C_i[j]$ be defined as the slot in the $j^{th}$ position of $C_i$ such that $1 \leq j \leq |C_i|$.

As used herein, a request (x,s) will refer to a request for a memory access operation a starting at address x and having a size $s \geq 1$. According to the LRU policy, if a cache $C_i$ is full (i.e. all its slots are occupied) and it receives a new request (x,s), when a request is implemented against the cache partition, and the cache partition has a fixed partition size, one out of the two following scenarios will occur for each address x, x+1, . . . , x+s−1:

I. If the address is already in the cache (i.e., comprising a cache hit), the address is promoted to the slot $C_i[1]$ of the cache.

II. Otherwise, in a cache miss, all the data already in the cache is shifted right to the next slot of the cache and the new address is pushed to the slot $C_i[1]$ (that page is said to be admitted). Therefore, the data originally occupying the slot $C_i[s]$ is evicted from cache.

Accordingly, when a request (x,s) is implemented against a cache $C_i$, it will necessarily occupy all the slots between $C_i[1]$ and $C_i[s]$.

Figure 3:
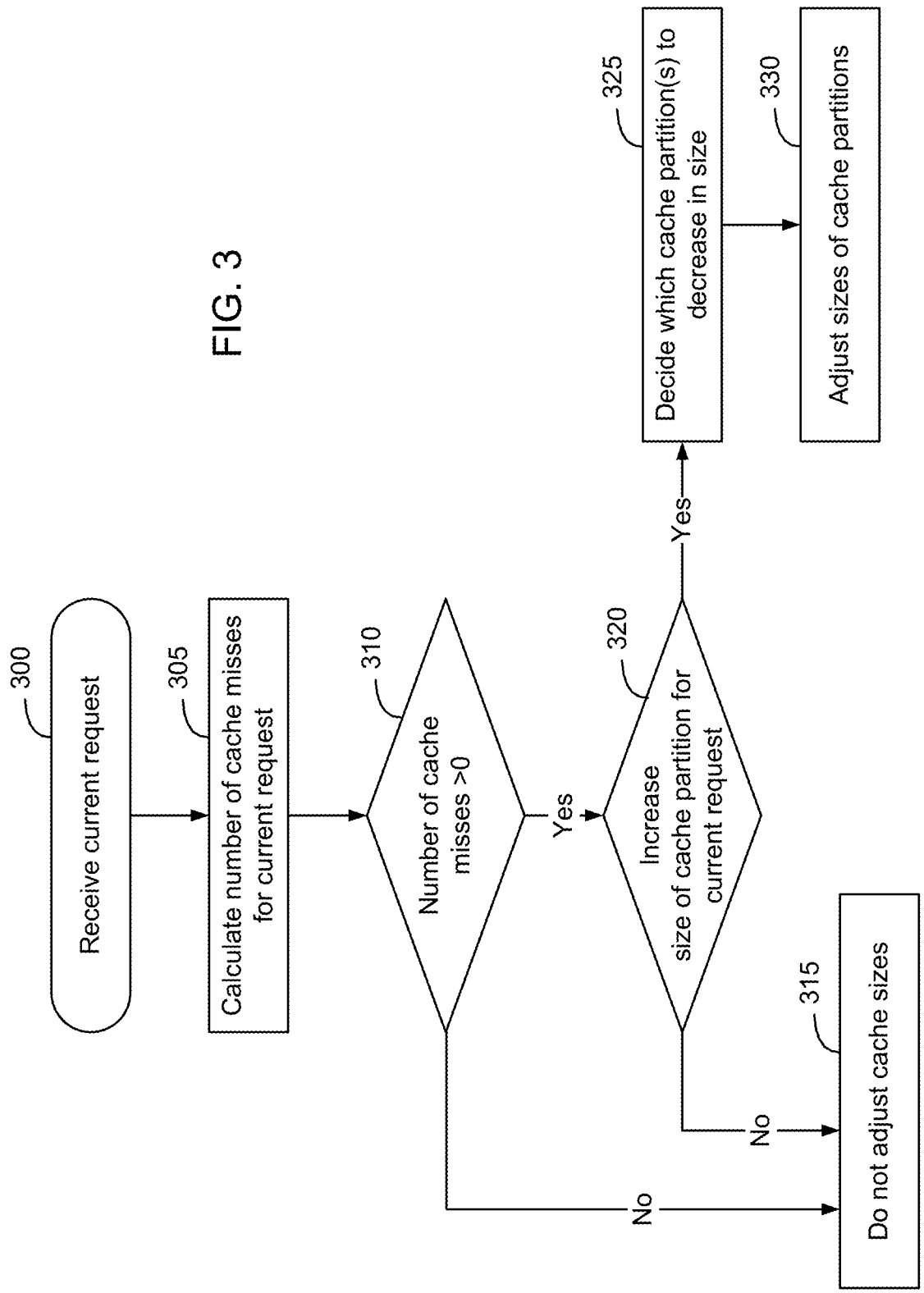
FIG. 3 is a flow chart of a method of dynamically adapting sizes of cache partitions in a partitioned cache.

FIG. 3 is a flow chart of a method of dynamically adjusting cache partition sizes according to some embodiments. As shown in FIG. 3, in some embodiments the method to orchestrate a partitioned cache dynamically, depends on two main decisions: (1) decide whether to increase the size of the cache partition associated with the current request; and (2) if the answer to question 1 is YES, decide which partition or set of partitions should be reduced in size to enable the current cache partition to be increased in size. Different techniques can be used to support both decisions depending on the implementation.

In some embodiments, for every new request (x,s) that is received against a cache partition, prior to implementing the request against the cache partition, the process starts by calculating the number of cache misses associated with the current request (FIG. 3 block 305). As discussed above, if a cache is not increased in size, each cache miss typically results in the admission of the requested page and eviction of the last page in the LRU queue.

However, according to some embodiments, because a determination is to be made as to whether to increase the size of the cache partition associated with the request, to proactively prevent data from being evicted from the cache partition, in some embodiments the method first calculates the number of misses preemptively, before implementing the request against the cache partition. Specifically, the process associated with block 305 occurs before the request is implemented against the current cache partition and, hence, occurs before evicting any data from the cache partition associated with the current request. By implementing the process of calculating the number of cache misses that will occur in connection with the request, before the request is implemented on the associated cache partition, the cache management system 128 is able to determine the number of additional slots that would be required to be added to the cache partition to accommodate the data associated with the current request to avoid any cache evictions from the current cache.

In some embodiments, the identity of the pages of data contained in the slots of the cache is maintained by the cache content data structure 202. The cache miss calculator 200 uses the cache content data structure 202 to analyze the number of cache misses that will occur in connection with implementation of the current request before the current request is implemented against the respective cache partition. As shown in FIG. 3, in some embodiments a determination is made at block 310 whether the number of cache misses is greater than zero. If the cache miss calculator 200 determines that the request can be serviced entirely from the cache (a determination of NO at block 310), implementation of the request against the cache partition will result in no evictions from the cache partition. Accordingly, no adjustments are required to be made to the current cache partition sizes and the workflow terminates (block 315).

If the number of misses is greater than zero (a determination of YES at block 310), in some embodiments the cache management system 128 decides whether to increase the size of the cache partition associated with the current request at block 320. If a decision is made to not increase the size of the cache partition associated with the current request (a determination of NO at block 320) no adjustments are made to the cache partition sizes, and the workflow terminates (block 315). The storage system 100 then proceeds to implement the current request against the cache partition using the current cache partition sizes, which causes the evictions to occur from the cache partition associated with the request in a normal manner.

Otherwise, if a decision is made to increase the size of the cache partition associated with the current request (a determination of YES at block 320), a determination is made as to which other partition or set of partitions will be reduced in size, to free up cache slots to enable the cache partition associated with the current request to be increased by the requisite amount (block 325). Once this determination has been made, the cache partition sizes are adjusted by the cache partition adjustment process 206 (block 330), and the system proceeds to implement the current request. Increasing the size of the cache partition associated with the current request, and decreasing the size one or more of the other cache partitions, results in one or more evictions occurring in the one or more other cache partitions rather than in the partition associated with the current request.

There are many possible ways to determine whether to increase the size of the partition associated with the request (block 320). In some embodiments, the decision implemented by the cache management system 128 at block 320 is to always increase the size of the cache partition associated with the cache request. This approach will minimize the number of instantaneous evictions. Each cache miss for a LUN will result in an increase in size of the cache partition associated with that LUN, to avoid evictions associated with the cache misses. In other embodiments, the cache management system 128 uses different logic to implement the decision at block 320, for example, by considering the historical hit probability of the cache partition to evaluate the potential benefit of increasing the partition size.

In some embodiments, upper and lower boundaries may be set on the size of the various cache partitions 119, such that the cache management system 128 always increases the size of the cache partition in connection with processing requests until the cache partition has reached a maximum size and, once the cache partition has reached its maximum size, will not continue to increase the size of the cache partition. Alternatively, the sizes of the cache partitions 119 may be interdependent such that a cache partition associated with a request will be increased in size unless doing so would cause one or more of the other cache partitions to fall below their respective minimum cache sizes. Many ways of implementing the determination described in connection with FIG. 3 block 320 may be envisioned.

In some embodiments, a ranked list of cache partitions 400 is used to implement the decision (block 325) as to which other partition or set of partitions will be reduced in size in order to accommodate the increased size of the cache partition associated with the request. In some embodiments, the ranked list is implemented as an LRU data structure (FIG. 4, 400) containing a listing of cache partition references (See FIG. 4, 410). Every time a request arrives, the associated entry 410 for the cache partition goes to the top of the rank in the LRU data structure 400. Other methods of ranking cache partitions may be used as well. For example, the various cache partitions may be weighted or receipt of a request may cause the cache partition to be moved up in the list a certain amount rather than bringing the partition all the way to the top of the ranked list.

Figure 4:
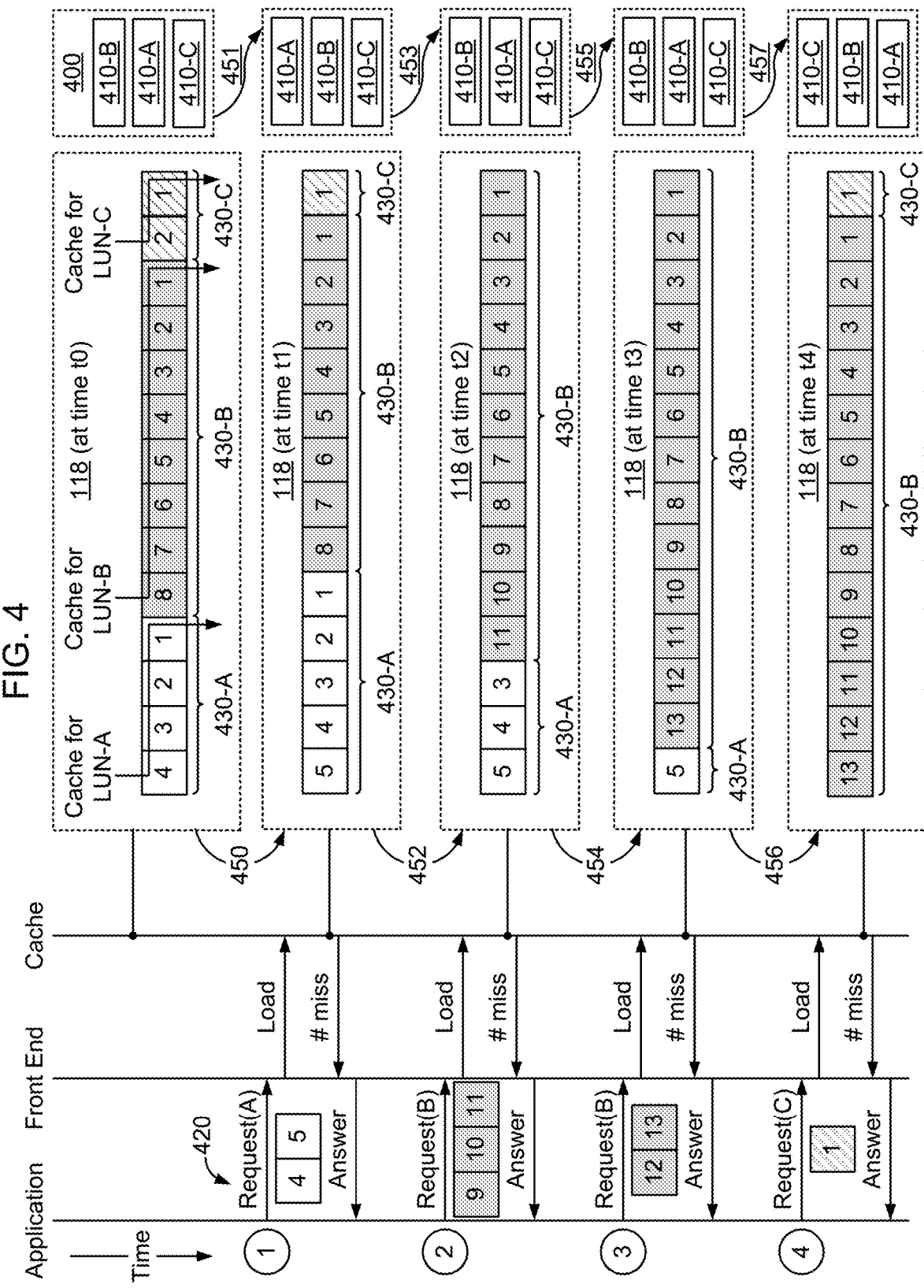
FIG. 4 is a functional block diagram of an example partitioned cache and associated data structures, showing the evolution of the partitions of the cache over time in connection with implementing requests against the cache partitions, according to some embodiments.

FIG. 4 is a functional block diagram of an example cache having three cache partitions associated with LUNs A, B, and C, and associated data structures. FIG. 4 shows the evolution of the cache over time, and shows how servicing a set of requests causes the cache partitions to dynamically adjust, according to some embodiments. In FIG. 4, the top line shows the initial state of the cache 118 at time=t0. The subsequent lines show the state of the cache 118 at time=t1, time=t2, time=t3, and time=t4.

FIG. 4 shows a set of examples of how a set of cache partitions 119 of cache 118 evolves over time. In FIG. 4, a ranked list of cache partitions 400 is implemented as a Least Recently Used (LRU) data structure 400 containing, as entries, identifiers 410A, 410B, 410C, associated with the cache partitions 119 of the cache 118. In some embodiments, when the ranked list of cache partitions 400 is implemented as a LRU data structure, each time a request 420 arrives, the associated entry 410 for the respective cache partition is brought to the top of the ranked list 400 and all other members of the ranked list of cache partitions 400 go down by one rank. For example, in FIG. 4, the initial order of the ranked list of cache partitions 400 at time=t0 has an entry 410-B for the cache partition associated with LUN B in the top slot, followed by the entry 410-A for the cache partition associated with LUN A in the next slot, and the entry 410-C for the cache partition associated with LUN C in the last slot. At time=t1, request 1 on the cache partition associated with LUN A is processed, so the entry 410-A is moved to the top of the ranked list of cache partitions 400 and all other entries 410-B and 410-C are moved down one rank.

The example shown in FIG. 4 will be described in connection with a cache policy implementation that specifies: (1) that servicing a request 420 never results in an eviction from the cache partition associated with the request, such that the cache partition is increased in size if necessary to implement the request (a determination of YES at FIG. 3 block 320); and (2) the lowest ranked cache partition in the ranked list of cache partitions 400 is selected (FIG. 3, block 325) to be reduced in size to accommodate the increase in size of the partition associated with the request. Where the ranked list of cache partitions 400 is implemented using an LRU data structure, this results in selection of the entry in the LRU data structure that has the lowest rank, i.e. the entry in the last slot of the LRU data structure 400.

Initially, as shown in FIG. 4, the cache has three partitions 430-A, 430-B, and 430-C for LUN A, LUN B, and LUN C, respectively. As shown in FIG. 4, LUN A initially has a cache size of four slots, LUN B initially has a cache size of 8 slots, and LUN C initially has a cache size of two slots. In FIG. 4, the cache slots associated with LUN A are white, the cache slots associated with LUN B are gray, and the cache slots associated with LUN C are cross-hashed. At time=t0, the ranked list of cache partitions 400 initially has the partitions ranked with LUN B on top, LUN A second, and LUN C as the lowest ranked partition.

At time=t1, a first request #1 (4,2) associated with LUN A is received, requesting pages 4 and 5. Since the cache partition 430-A previously (at time=t0) contained page 4 but not page 5, the process determines (FIG. 3 step 305) that there is one cache miss associated with the first request.

In some embodiments, the number of cache misses is determined initially, before the request is implemented against the cache partition. For example, in some embodiments the cache management system 128 (see FIG. 2) has a cache content data structure 202 or a set of cache content data structures 202 containing information about what pages are contained in each cache partition of cache 118. The cache content data structure 202 may be implemented as a hash table or other searchable data structure. Other ways of determining cache misses may likewise be used, for example by searching the cache partition itself.

In some embodiments, determining the number of cache misses occurs before evicting any data from the cache partition or adding the new pages to the cache partition, and this preemptive determination is used to decide whether to increase the size of the cache partition to avoid the evictions. In FIG. 4 it is assumed that every time a request is received that the partition associated with the request will be increased in size to prevent an eviction from that cache partition (a determination of YES at FIG. 3 block 320). Accordingly, to process request #1, the partition associated with LUN A 430-A must be increased in size by one slot to enable page 5 to be admitted to the cache partition 430-A.

The process then continues to determine which of the other cache partitions should be reduced in size to accommodate the increase in the partition size of the cache partition 430-A associated with request #1 (FIG. 3, block 325). In the example shown in FIG. 4, whenever a request is processed, if another cache partition is required to be decreased in size to accommodate the increase in size of the cache partition associated with the request, the last ranked cache partition in the ranked list of cache partitions 400, at the time of receipt of the request, is always selected to be decreased in size. Accordingly, as shown in the top line of FIG. 4, at time=t0, just before request number 1 was received, LUN C was the last ranked cache partition in the ranked list 400. Accordingly, as shown by arrow 450 of FIG. 4, servicing request #1 causes the size of the cache partition associated with LUN A 430-A to be increased by one slot to have five slots, and the size of the cache partition associated with LUN C 430-C is decreased in size by one slot.

As shown by arrow 451 of FIG. 4, in connection with processing request #1 associated with the cache partition for LUN-A, the ranked list of cache partitions 400 is adjusted to move the entry 410-A associated with the cache for LUN-A to the top spot, and each of the other entries 410-B is moved down one rank. The entry 410-C was the lowest ranked entry in the ranked list of cache partitions 400 previously, so it is not able to be further demoted and will remain the lowest ranked entry in the ranked list of cache partitions 400.

At time=t2, request #2 (9,3) associated with the cache partition for LUN-B arrives. Request (9,3) is a request for three pages starting at page 9. Request #2 is associated with LUN B, and all three pages from the request are missing in from cache partition for LUN B 430-B. Accordingly, the cache partition 430-B is increased in size by three slots. The entry 410-C is the lowest ranked entry in the ranked list of cache partitions 400 when request #2 arrived. Since cache 430-C has only one slot, it is reduced by one slot. Cache 430-A has the next lowest ranking entry in the ranked list of cache partitions 400, and accordingly cache 430-A is reduced in size by two slots. The cache adjustments to accommodate request #2 are shown by arrow 452 of FIG. 4.

As shown by arrow 453 of FIG. 4, in connection with processing request #2, because request #2 is directed to the cache for LUN-B, the entry 410-B is moved to the top entry in the ranked list of cache partitions 400, and each of the other entries is moved down one rank.

At time=t3, request #3 (12,2) associated with the cache partition for LUN-B arrives. Request (12,2) is a request for two pages starting at page 12. Request #3 is associated with LUN B, and both pages from the request are missing in from cache partition for LUN B 430-B. Accordingly, the cache partition 430-B is increased in size by two slots. The entry 410-C is the lowest ranked entry in the ranked list of cache partitions 400 when request #3 arrived, however the cache associated with entry 410-C currently has no slots in the cache. Accordingly, the next lowest ranked cache partition 410-A in the ranked list 400 is selected to be reduced in size by two slots. Accordingly, as shown by arrow 454, the cache partitions are adjusted such that the cache partition for cache B is increased in size to 13 slots and the cache partition size for cache A is decreased in size to 1 slot. Because the entry 410-B associated with the cache partition for cache B was previously at the top of the ranked list, no changes are made to the ranked list as shown by arrow 455.

At time=t4, request #4 (1,1) associated with the cache partition for LUN-C arrives. Request (1,1) is a request for one page starting at page 1. Request #4 is associated with LUN C, which currently has no slots in the cache. Accordingly, processing the request #4 will result in one cache miss. The cache partition 430-C is therefore increased in size by one slots. The entry 410-A is the lowest ranked entry (other than entry 410-C) in the ranked list of cache partitions 400 when request #4 arrived. Accordingly, the cache partition associated with LUN-A is selected to be reduced in size by one slot as shown by arrow 456. Processing of request #4 also causes the entries in the ranked list 400 to be reordered as shown by arrow 457.

As shown in FIG. 4, in some embodiments the partition sizes are not set in advance and are allowed to increase in size until a single cache partition occupies the entire cache, or decrease in size such that a given cache partition may have no slots in the cache at a given point in time. However, in some embodiments it is possible to establish boundaries, globally or for each individual beneficiary, if additional information is available from the applications, to limit the amount that the cache partition sizes may fluctuate.

The simplified example shown in FIG. 4 was drawn using a very small cache (14 slots) that is shared by up to three partitions associated with three beneficiaries. In an actual application of the method to a large-scale storage system, the addressing space is very large, and pages are identified by correspondingly large values, cache partitions comprise many thousands of slots, and there may be hundreds or thousands of LUNs sharing the cache 118. The method requires no adaptation to apply to large scale domains, as would be apparent to a person of ordinary skill in the art.

It should be noted that, in an actual application, the ratio between the sizes of requests and the number of slots in a partition is drastically smaller than shown in the example of FIG. 4. That is, typically the sizes of the partitions are orders of magnitude larger than the average size of the requests. Hence, the fluctuations in the size of the partitions are much less evident than in the example shown in FIG. 4.

An experiment was conducted to compare the process of dynamically adjusting the sizes of partitions of the LRU cache (line 515), described above, with a traditional LRU cache (line 510), namely a Global LRU Cache. Additionally, a theoretical upper bound (line 500) was calculated, assuming an infinite cache, and an optimal fixed cache (line 505) with optimal partition sizes based on an oracle, resultant of a grid search over the partitions size for each LUN.

Figure 5:
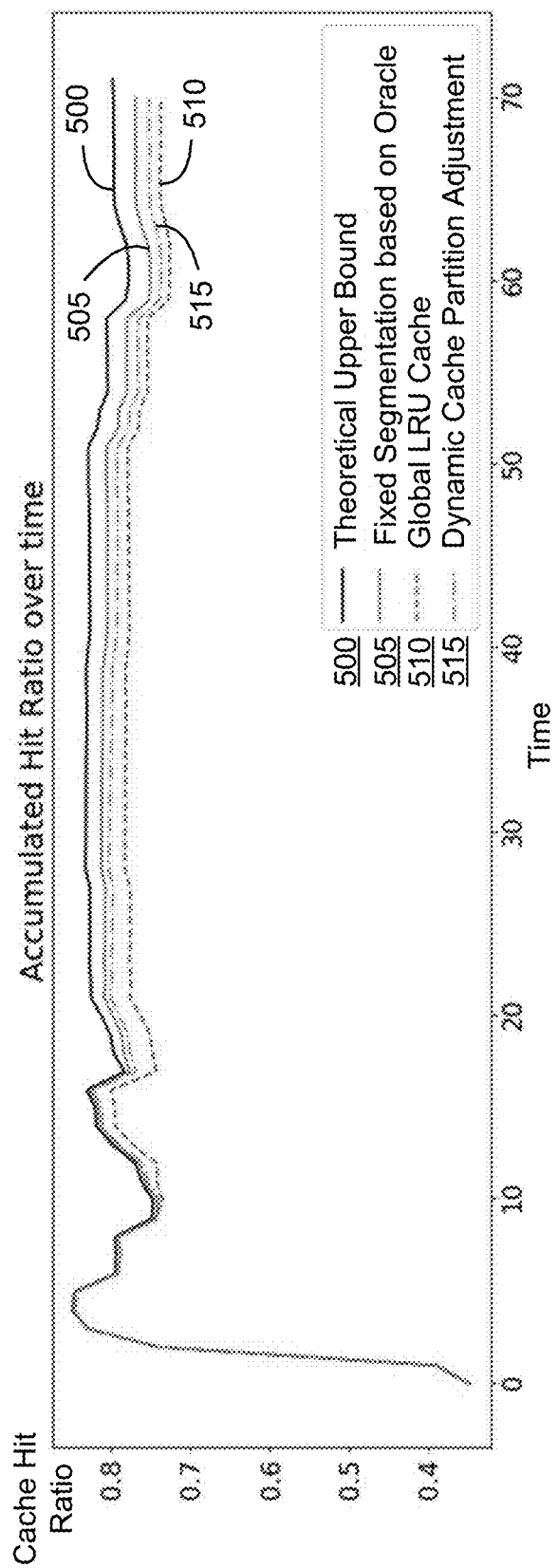
FIG. 5 is a graph showing experimental results of the accumulated cache hit ratio over time, comparing a theoretical upper bound on the cache hit rate, a fixed set of cache partitions based on an oracle, a global Least Recently Used (LRU) cache, and the dynamic cache partition adjustment process described herein, according to some embodiments.

FIG. 5 shows a graph generated as a result of the experiment. In this experiment, 77 minutes of an actual storage system workload was replayed several times in a cache simulator. The first 5 minutes of workload was used to set up the initial LRU size for each partition and the several strategies were compared throughout the remainder of the simulation.

FIG. 5 shows a comparison between the partitioned cache per LUN and the global cache. Each LUN has an independent LRU cache whose size will automatically vary to accommodate its IOPS. For this experiment we can see that the dynamically adjusting the partition sizes (line 515) outperformed the global cache (line 510) by 2%. Additionally, dynamically adjusting cache partitions using the process described herein (line 515) performs almost as well as the use of fixed partitions based on an oracle (grid search) (line 505).

The methods described herein may be implemented as software configured to be executed in control logic such as contained in a Central Processing Unit (CPU) or Graphics Processing Unit (GPU) of an electronic device such as a computer. In particular, the functions described herein may be implemented as sets of program instructions stored on a non-transitory tangible computer readable storage medium. The program instructions may be implemented utilizing programming techniques known to those of ordinary skill in the art. Program instructions may be stored in a computer readable memory within the computer or loaded onto the computer and executed on computer's microprocessor. However, it will be apparent to a skilled artisan that all logic described herein can be embodied using discrete components, integrated circuitry, programmable logic used in conjunction with a programmable logic device such as a Field Programmable Gate Array (FPGA) or microprocessor, or any other device including any combination thereof. Programmable logic can be fixed temporarily or permanently in a tangible computer readable medium such as random-access memory, a computer memory, a disk drive, or other storage medium. All such embodiments are intended to fall within the scope of the present invention.

Throughout the entirety of the present disclosure, use of the articles "a" or "an" to modify a noun may be understood to be used for convenience and to include one, or more than one of the modified noun, unless otherwise specifically stated.

Elements, components, modules, and/or parts thereof that are described and/or otherwise portrayed through the figures to communicate with, be associated with, and/or be based on, something else, may be understood to so communicate, be associated with, and or be based on in a direct and/or indirect manner, unless otherwise stipulated herein.

Various changes and modifications of the embodiments shown in the drawings and described in the specification may be made within the spirit and scope of the present invention. Accordingly, it is intended that all matter contained in the above description and shown in the accompanying drawings be interpreted in an illustrative and not in a limiting sense. The invention is limited only as defined in the following claims and the equivalents thereto.

What is claimed is:

1. A method of dynamically adjusting sizes of cache partitions of a partitioned cache, each cache partition being implemented in memory and having a respective plurality of slots to be used for caching purposes, comprising:
   receiving a plurality of cache requests, each cache request being associated with a respective partition of the partitioned cache;
   for each cache request:
      determining a number of cache misses associated with the cache request on the respective cache partition;
      increasing a size of the respective cache partition by a number of cache slots equal to the number of cache misses;
      selecting a cache partition other than the respective cache partition; and
      decreasing a size of the selected other cache partition by the number of cache slots equal to the number of cache misses; and
      implementing the cache request on the respective cache partition after increasing the size of the respective cache partition;
      wherein each time a cache request is received, the steps of determining the number of cache misses associated with the cache request and increasing the size of the respective cache partition by the number of cache slots equal to the number of cache misses occur before implementing the cache request against the respective cache partition, to prevent the cache misses associated with the cache request from resulting in evictions of data from the respective cache partition.

2. The method of claim 1, wherein the step of decreasing the size of the selected other cache partition results in eviction of data from the selected other cache partition.

3. The method of claim 1, wherein selecting the cache partition comprises ranking the cache partitions based on frequency of use, and selecting the least recently used cache partition in the partitioned cache as the selected other cache partition.

4. The method of claim 1, further comprising setting an upper size limit on sizes of the cache partitions, and not performing the step of increasing the size of the respective cache partition if the step of increasing the size of the respective cache partition would cause the first size of the respective cache partition to exceed the upper size limit.

5. The method of claim 1, further comprising setting a lower size limit on sizes of the cache partitions, and not performing the step of decreasing the size of the selected other cache partition if the step of decreasing the size of the selected other cache partition would cause the size of the selected other cache partition to drop below the lower size limit.

6. A storage system, comprising:
   a plurality of storage resources;
   a partitioned cache having multiple cache partitions, each cache partition being implemented in the storage resources and having a respective plurality of slots to be used for caching purposes; and a cache management system, the cache management system containing control logic configured to:

receive a plurality of cache requests, each cache request being associated with a respective partition of the partitioned cache; and for each cache request:

determine a number of cache misses associated with the first request on the respective cache partition;

increase a size of the respective cache partition by a number of cache slots equal to the number of cache misses;

select a cache partition other than the respective cache partition;

decrease a size of the selected other cache partition by the number of cache slots equal to the number of cache misses; and implement the cache request on the respective cache partition after increasing the size of the respective cache partition;

wherein each time a cache request is received, the control logic is configured to determine the number of cache misses associated with the cache request and increase the size of the respective cache partition by the number of cache slots equal to the number of cache misses before implementing the cache request against the respective cache partition, to prevent the cache misses associated with the cache request from resulting in evictions of data from the respective cache partition.

7. The storage system of claim 6, wherein the decrease of the size of the selected other cache partition results in eviction of data from the selected other cache partition.

8. The storage system of claim 6, wherein the control logic configured to select the cache partition comprises control logic configured to rank the cache partitions based on frequency of use, and select the least recently used cache partition in the partitioned cache as the selected other cache partition.

9. The storage system of claim 6, further comprising control logic configured to set an upper size limit on the size of the respective cache partition, and not increase the size of the respective cache partition if increasing the size of the respective cache partition would cause the size of the respective cache partition to exceed the upper size limit.

10. The storage system of claim 6, further comprising control logic configured to set a lower size limit on the sizes of the cache partitions, and not decrease the size of the selected other cache partition if decreasing the size of the selected other cache partition would cause the size of the selected other cache partition to drop below the lower size limit.

11. A non-transitory tangible computer readable storage medium having stored thereon a computer program for dynamically adjusting sizes of cache partitions of a partitioned cache, each cache partition being implemented in memory and having a respective plurality of slots to be used for caching purposes, the computer program including a set of instructions which, when executed by a computer, cause the computer to perform a method comprising the steps of:

receiving a plurality of cache requests, each cache request being associated with a respective partition of the partitioned cache;

for each cache request:

determining a number of cache misses associated with the cache request on the respective cache partition;

increasing a size of the respective cache partition by a number of cache slots equal to the number of cache misses;

selecting a cache partition other than the respective cache partition;

decreasing a size of the selected other cache partition by the number of cache slots equal to the number of cache misses; and implementing the cache request on the respective cache partition after increasing the size of the respective cache partition;

wherein each time a cache request is received, the steps of determining the number of cache misses associated with the first cache request and increasing the size of the respective cache partition by the number of cache slots equal to the number of cache misses occur before implementing the cache request against the respective cache partition, to prevent the cache misses associated with the cache request from resulting in evictions of data from the respective cache partition.

12. The non-transitory tangible computer readable storage medium of claim 11:

wherein selecting the cache partition comprises ranking the cache partitions based on frequency of use, and selecting the least recently used cache partition in the partitioned cache as the selected other cache partition; and wherein the step of decreasing the size of the selected other cache partition results in eviction of data from the selected other cache partition.

13. The non-transitory tangible computer readable storage medium of claim 11, the method further comprising:

setting an upper size limit on sizes of the cache partitions, and not performing the step of increasing the size of the respective cache partition if the step of increasing the size of the respective cache partition would cause the first size of the respective cache partition to exceed the upper size limit; or setting a lower size limit on the sizes of the cache partitions, and not performing the step of decreasing the size of the selected other cache partition if the step of decreasing the size of the selected other cache partition would cause the size of the selected other cache partition to drop below the lower size limit.

* * * * *